United States Patent
Nishino et al.

(10) Patent No.: US 10,593,045 B2
(45) Date of Patent: Mar. 17, 2020

(54) INFORMATION PROCESSING APPARATUS AND METHOD OF CONTROLLING THE SAME

(71) Applicant: CANON KABUSHIKI KAISHA, Tokyo (JP)

(72) Inventors: Daisuke Nishino, Kawasaki (JP); Hisashi Kawabayashi, Sagamihara (JP)

(73) Assignee: CANON KABUSHIKI KAISHA, Tokyo (JP)

(*) Notice: Subject to any disclaimer, the term of this patent is extended or adjusted under 35 U.S.C. 154(b) by 84 days.

(21) Appl. No.: 15/848,834

(22) Filed: Dec. 20, 2017

(65) Prior Publication Data

US 2018/0182107 A1 Jun. 28, 2018

(30) Foreign Application Priority Data

Dec. 27, 2016 (JP) .................. 2016-254092

(51) Int. Cl.
*G06T 7/20* (2017.01)
*G06K 9/00* (2006.01)
*G06K 9/32* (2006.01)
*G06K 9/46* (2006.01)
*G06K 9/34* (2006.01)

(52) U.S. Cl.
CPC ............ *G06T 7/20* (2013.01); *G06K 9/00228* (2013.01); *G06K 9/00335* (2013.01); *G06K 9/00771* (2013.01); *G06K 9/3241* (2013.01); *G06K 9/342* (2013.01); *G06K 9/4604* (2013.01); *G06T 2207/10016* (2013.01)

(58) Field of Classification Search
CPC .......... G06K 9/00335; G06K 9/00771; G06K 9/3241; G06T 7/20; G06T 7/215; G06T 2207/30232
See application file for complete search history.

(56) References Cited

U.S. PATENT DOCUMENTS

| 2015/0294183 | A1* | 10/2015 | Watanabe et al. .......................... G06K 9/00771 382/203 |
| 2016/0247272 | A1 | 8/2016 | Nishino et al. ......... G06T 7/004 |
| 2016/0260106 | A1* | 9/2016 | Tonoike ............. G06K 9/00295 |
| 2017/0193681 | A1 | 7/2017 | Nomoto et al. ........ G06T 11/60 |
| 2017/0301106 | A1 | 10/2017 | Kawabayashi ............ G06T 7/70 |
| 2018/0061161 | A1* | 3/2018 | Nagao et al. ............ G06M 3/08 |

FOREIGN PATENT DOCUMENTS

| JP | 2007-281680 A | 10/2007 |
| JP | 2016-157336 A | 9/2016 |

\* cited by examiner

*Primary Examiner* — Andrew W Johns

(74) *Attorney, Agent, or Firm* — Carter, DeLuca & Farrell LLP

(57) ABSTRACT

An information processing apparatus comprises a moving object detection unit configured to detect a moving object from a captured image; a passage determination unit configured to determine that the moving object has passed through a predetermined position in the captured image; an image extraction unit configured to extract a region image of the moving object that has passed through the predetermined position from the captured image; and a display control unit configured to make a display unit display, in time series, the region image for each passing direction of the moving object that has passed through the predetermined position.

20 Claims, 18 Drawing Sheets

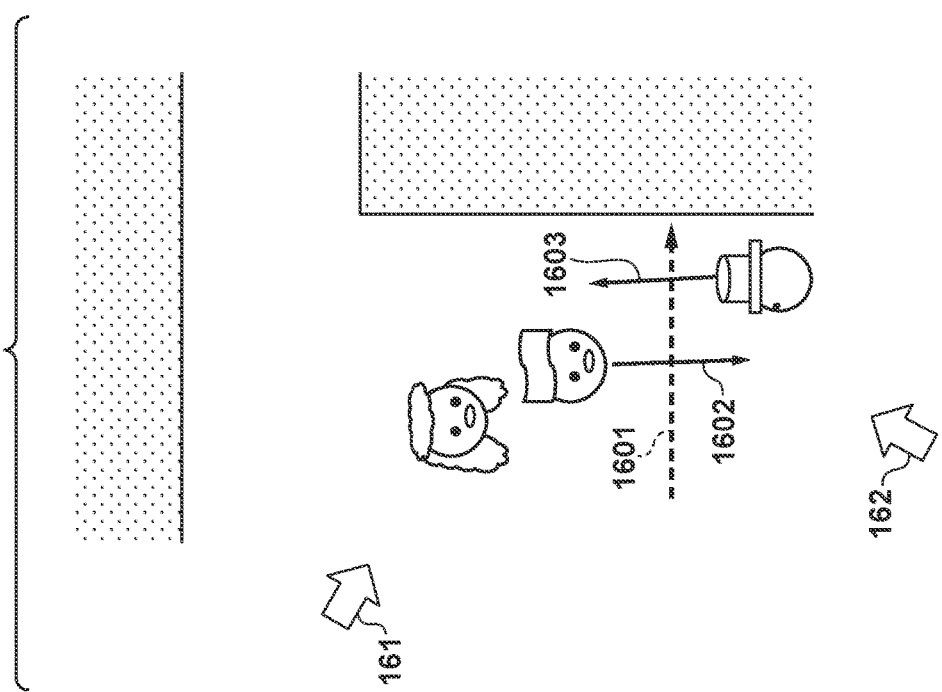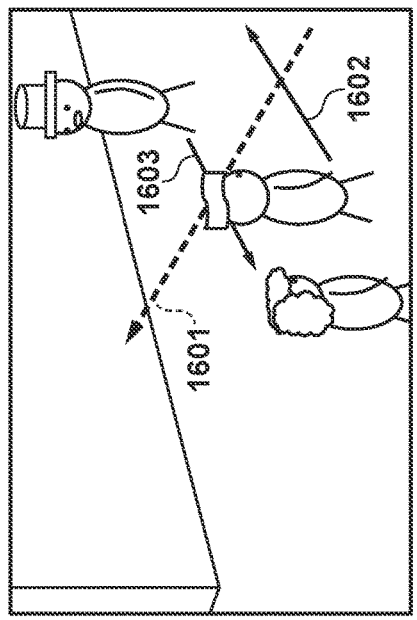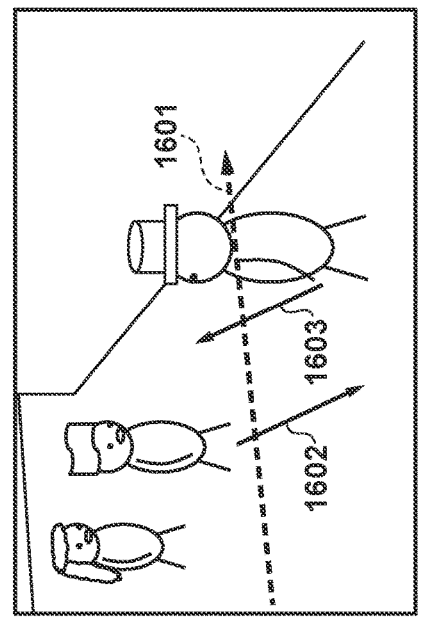

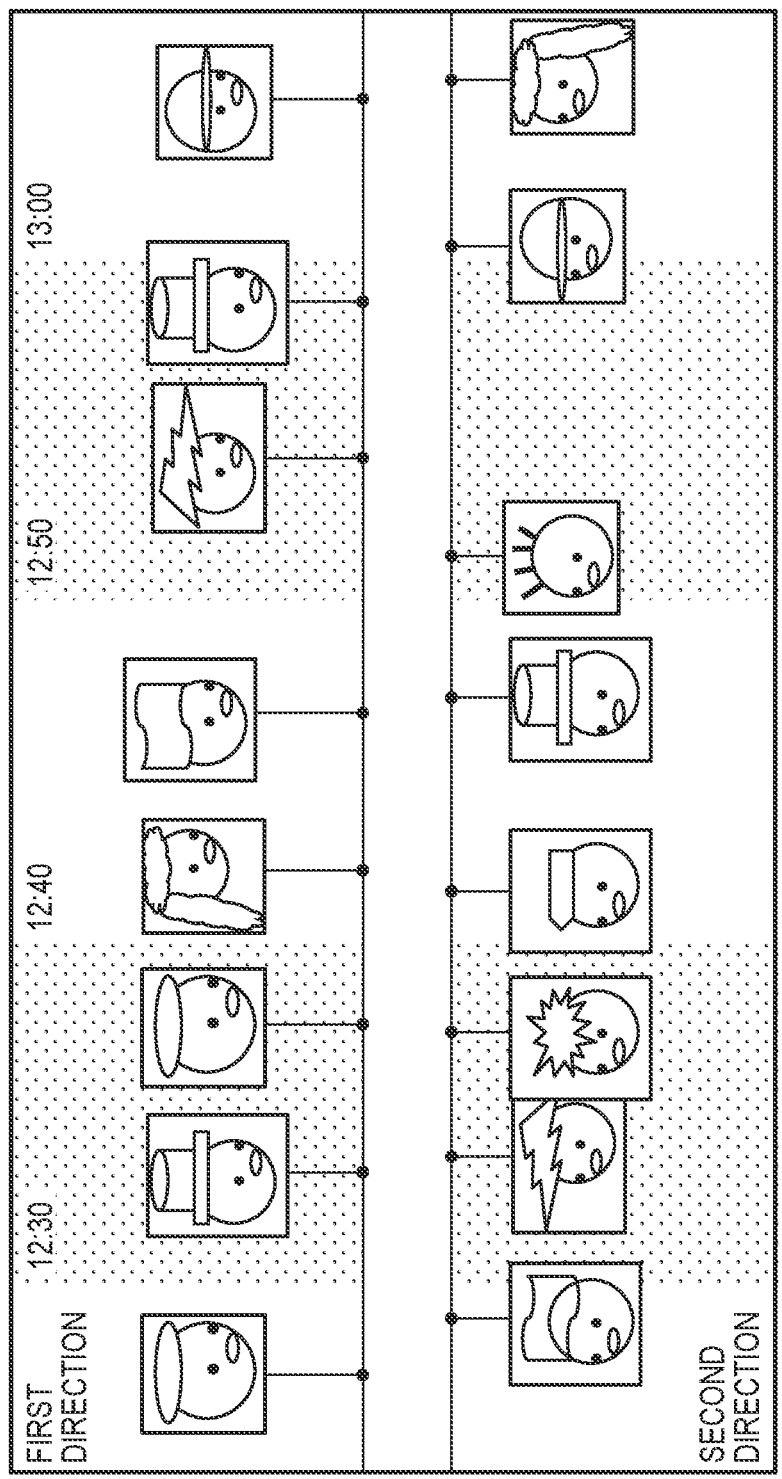

INFORMATION PROCESSING APPARATUS AND METHOD OF CONTROLLING THE SAME

BACKGROUND OF THE INVENTION

Field of the Invention

The present invention relates to an information processing apparatus and a method of controlling the same.

Description of the Related Art

There is a system which designates a line segment in advance on an image and counts moving objects that have passed through the line segment. In this system, it is possible to count the moving objects for each passing direction and after the end of the count, output a time-series change in the number of passing moving objects by an instruction from an operator. This system can be used for a traffic census, a customer behavior analysis of a store, or the like.

In a conventional counting system, although it is possible to output the time-series change in the number of passing moving objects, it is impossible to output the type of moving object detected by this. For example, it is impossible to judge from an output result whether the passing moving object is a person, a vehicle, or an animal.

To cope with this, Japanese Patent Laid-Open No. 2007-281680 discloses a technique of collating each image that makes a moving image with a face image designated by a user and displaying the detected face image in time series, that is, a technique of displaying a list of face images of a person who appears in the moving image.

However, the technique described in Japanese Patent Laid-Open No. 2007-281680 only displays a moving object on a single time series and cannot grasp the behavior of the moving object according to a passing direction.

SUMMARY OF THE INVENTION

According to one aspect of the present invention, there is provided an information processing apparatus comprising: a moving object detection unit configured to detect a moving object from a captured image; a passage determination unit configured to determine that the moving object has passed through a predetermined position in the captured image; an image extraction unit configured to extract a region image of the moving object that has passed through the predetermined position from the captured image; and a display control unit configured to make a display unit display, in time series, the region image for each passing direction of the moving object that has passed through the predetermined position.

Further features of the present invention will become apparent from the following description of exemplary embodiments with reference to the attached drawings.

BRIEF DESCRIPTION OF THE DRAWINGS

FIGS. 16A to 16C are views each showing the outline of a scene according to the fifth embodiment;

FIG. 19 is a view showing a display example according to the fifth embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Arrangement of Information Processing System and Functional Arrangement of Each Apparatus>

Figure 1:
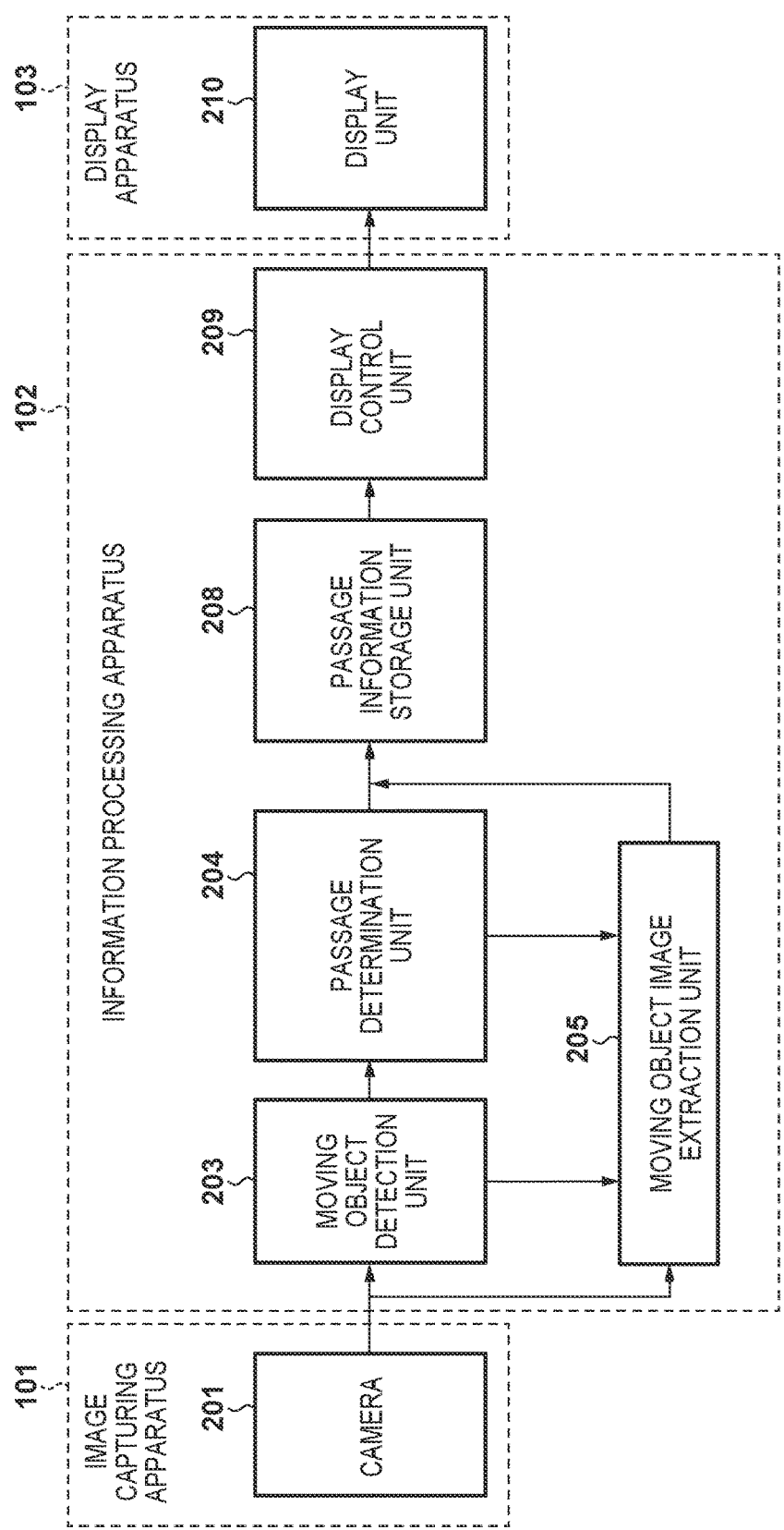
FIG. 1 is a block diagram showing an example of the functional arrangement of each apparatus of an information processing system according to the first embodiment.

FIG. 1 is a block diagram showing an example of the functional arrangement of each apparatus of an information processing system according to the first embodiment. The information processing system includes an image capturing apparatus 101, an information processing apparatus 102, and a display apparatus 103. The image capturing apparatus 101 includes a camera 201. The information processing apparatus 102 includes a moving object detection unit 203, a passage determination unit 204, a moving object image extraction unit 205, a passage information storage unit 208, and a display control unit 209. The display apparatus 103 includes a display unit 210.

Figure 3:
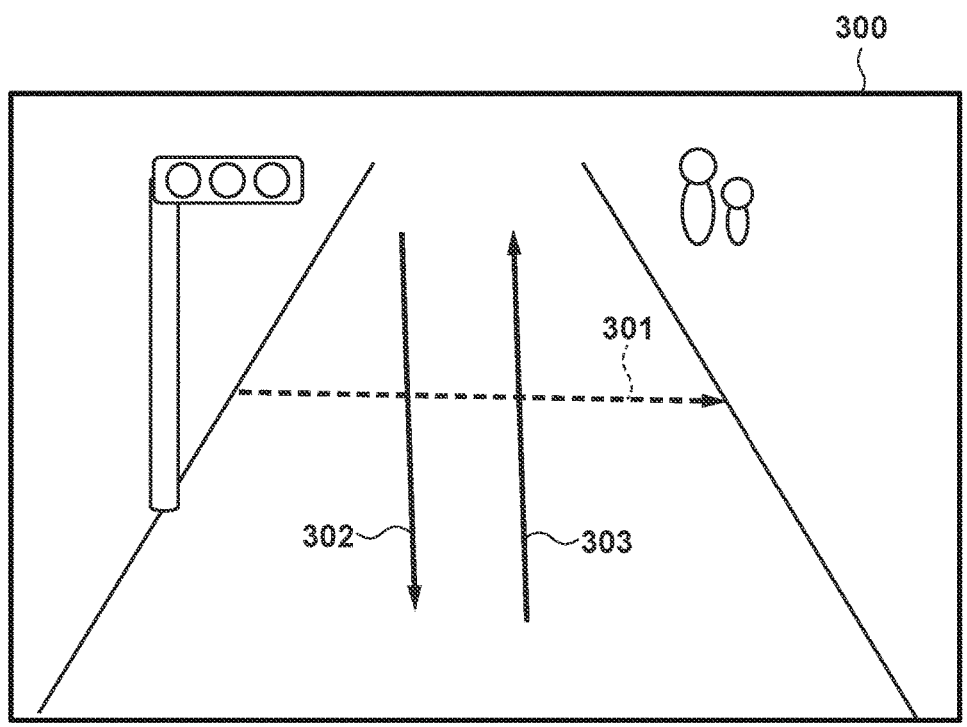
FIG. 3 is a view showing the outline of a scene according to the first embodiment.

The moving object detection unit 203 detects and tracks a moving object by obtaining an image from the camera 201 of the image capturing apparatus 101, and outputs coordinates and motion vector in a rectangular region of the moving object. The passage determination unit 204 makes, on the moving object detected by the moving object detection unit 203, an intersection determination between the coordinates and motion vector in a rectangle of the moving object and a passage sensing line at a position designated in advance, and determines whether the moving object has passed through the passage sensing line on a two-dimensional image. Note that FIG. 3 is a view showing an example of a video scene captured by the image capturing apparatus 101 according to this embodiment. By designating a passage sensing line 301 in advance in a video scene 300, the information processing apparatus 102 can sense the passage of the moving object in two directions of a first direction 302 and second direction 303 crossing the passage sensing line 301. The passage determination unit 204 outputs, for each moving object, a passage determination result and a passing direction if it determines that the moving object has passed through.

Figure 5:
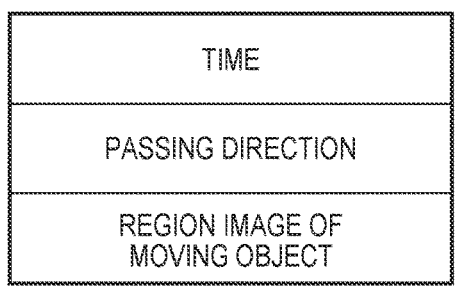
FIG. 5 is a table showing passage information stored in a passage information storage unit according to the embodiment.

The moving object image extraction unit 205 extracts a region image of the moving object determined by the passage determination unit 204 that it has passed through the passage sensing line from the image obtained from the camera 201. More specifically, based on the coordinates in the rectangular region of the moving object output by the moving object detection unit 203, the moving object image extraction unit 205 extracts the rectangular region of the moving object as the region image. Setting current time as passage occurrence time, the passage information storage unit 208 associates information on the passing direction output by the passage determination unit 204 with the region image of the moving object extracted by the moving object image extraction unit 205 and stores them as passage information. Note that FIG. 5 shows an example of the passage information stored in the passage information storage unit 208. The passage information includes time, the passing direction, and the region image of the moving object.

According to a user instruction, the display control unit 209 controls the display unit 210 of the display apparatus 103 to display the region image of the moving object and passing time in time series for each passing direction based on the passage information stored in the passage information storage unit 208.

<Hardware Arrangement of Each Apparatus>

Figure 2:
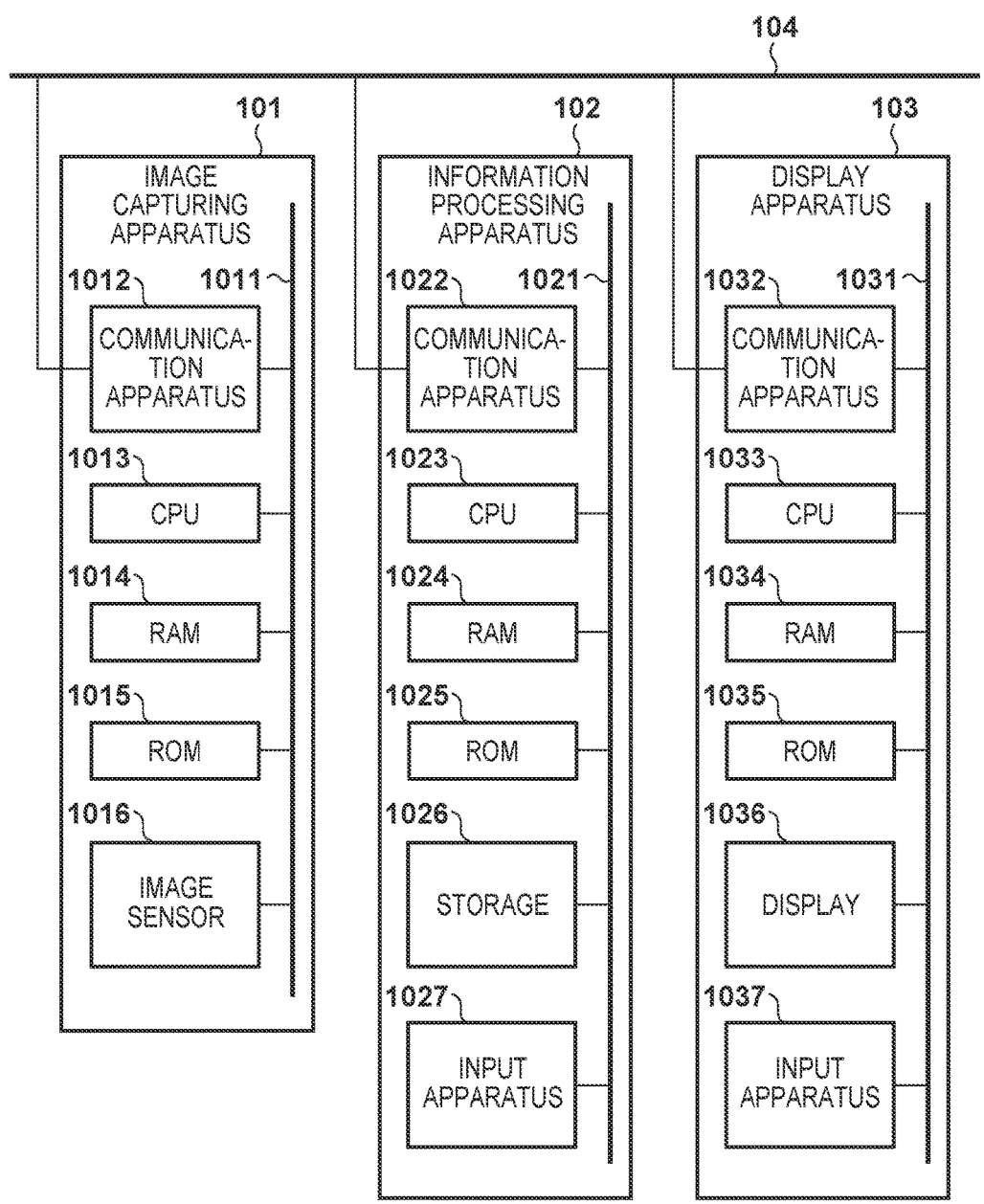
FIG. 2 is a block diagram showing an example of the hardware arrangement of each apparatus of the information processing system according to the first embodiment.

FIG. 2 is a block diagram showing an example of the hardware arrangement of each apparatus of the information processing system according to the first embodiment. The image capturing apparatus 101, the information processing apparatus 102, and the display apparatus 103 that form the information processing system are connected to a network 104.

The image capturing apparatus 101 is an apparatus that captures an image and includes a communication bus 1011, a communication apparatus 1012, a CPU 1013, a RAM 1014, a ROM 1015, and an image sensor 1016. The communication bus 1011 connects respective constituent elements of the image capturing apparatus 101. The communication apparatus 1012 is a communication interface for communicating with the network 104. The CPU 1013 is an arithmetic device and performs arithmetic operation needed for image capturing processing. The RAM 1014 is an area for storing various temporary data needed to execute control programs. The ROM 1015 stores control programs executed by the CPU 1013 and various constants needed to execute the control programs. The image sensor 1016 captures an image. The information processing apparatus 102 is an apparatus that processes the image captured by the image capturing apparatus 101 and includes a communication bus 1021, a communication apparatus 1022, a CPU 1023, a RAM 1024, a ROM 1025, a storage 1026, and an input apparatus 1027. The communication bus 1021 connects respective constituent elements of the information processing apparatus 102. The communication apparatus 1022 is a communication interface for communicating with the network 104. The CPU 1023 is an arithmetic device and performs arithmetic operation needed for information processing. The RAM 1024 is an area for storing various temporary data needed to execute control programs. The ROM 1025 stores control programs executed by the CPU 1023 and various constants needed to execute the control programs. The storage 1026 is a non-volatile storage such as a hard disk. The input apparatus 1027 is a user interface device such as a keyboard, a mouse, or a touch panel and is used to input the start or end of the information processing and other various instructions to the information processing apparatus 102.

The display apparatus 103 is an apparatus that presents an information processing result processed by the information processing apparatus 102 to a user. The display apparatus 103 includes a communication bus 1031, a communication apparatus 1032, a CPU 1033, a RAM 1034, a ROM 1035, a display 1036, and an input apparatus 1037. The communication bus 1031 connects respective constituent elements of the display apparatus 103. The communication apparatus 1032 is a communication interface for communicating with the network 104. The CPU 1033 is an arithmetic device and performs arithmetic operation needed for display processing. The RAM 1034 is an area for storing various temporary data needed to execute control programs. The ROM 1035 stores control programs executed by the CPU 1033 and various constants needed to execute the control programs. The display 1036 displays the information processing result based on the control of the information processing apparatus 102. The input apparatus 1037 is a user interface device such as a keyboard, a mouse, or a touch panel and is used to input an operation instruction about display to the display apparatus 103.

Note that in this embodiment an arrangement has been described in which the image capturing apparatus 101, the information processing apparatus 102, and the display apparatus 103 are separated from each other. However, an arrangement in which the image capturing apparatus 101 and the information processing apparatus 102 are integrated with each other or an arrangement in which the information processing apparatus 102 and the display apparatus 103 are integrated with each other may be adopted. Alternatively, an arrangement in which all of them are integrated with each other may be adopted.

<Processing>

Figure 4:
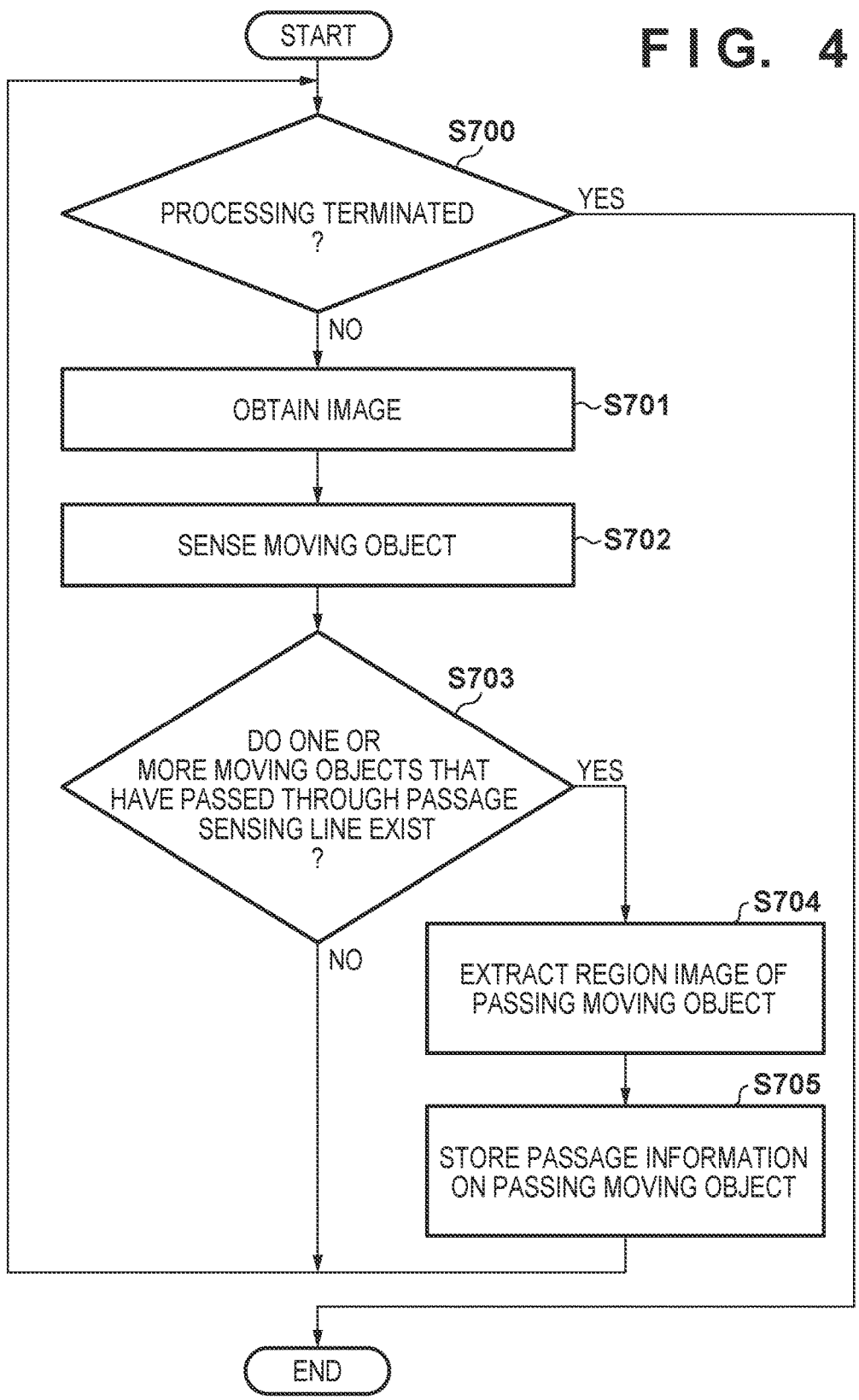
FIG. 4 is a flowchart showing a processing sequence according to the first embodiment.

A processing sequence executed by the information processing apparatus according to this embodiment will now be described with reference to a flowchart in FIG. 4. In step S700, the display control unit 209 of the information processing apparatus 102 determines whether to terminate processing. The display control unit 209 makes the determination based on, for example, whether an instruction to terminate information processing is made via the input apparatus 1027. If the processing is not terminated, the process advances to step S701. If the processing is terminated, the information processing apparatus 102 terminates an operation. In step S701, the moving object detection unit 203 obtains an image from the camera 201 of the image capturing apparatus 101. In step S702, the moving object detection unit 203 detects and tracks a moving object from the obtained image, and outputs coordinates and motion vector in a rectangular region of the moving object.

In step S703, the passage determination unit 204 makes, on each of one or more moving objects detected by the moving object detection unit 203, an intersection determination between the coordinates and motion vector in a rectangle of the moving object and a passage sensing line at a position designated in advance. Then, the passage determination unit 204 determines whether the moving object has passed through the passage sensing line on a two-dimensional image. If there are one or more moving objects that have passed through the passage sensing line, the process advances to step S704. On the other hand, if there is no moving object that has passed through the passage sensing line, the process returns to step S700.

In step S704, the moving object image extraction unit 205 extracts a region image of the moving object determined by the passage determination unit 204 that it has passed through the passage sensing line from the image obtained from the camera 201. More specifically, based on the coordinates in the rectangular region of the moving object output by the moving object detection unit 203, the moving object image extraction unit 205 extracts the rectangular region of the moving object as the region image.

In step S705, setting current time as passage occurrence time, the passage information storage unit 208 associates information on the passing direction output by the passage determination unit 204 with the region image of the moving object extracted by the moving object image extraction unit 205 and stores them as passage information. Subsequently, the process returns to step S700. A series of processes in FIG. 4 thus ends.

Figure 6:
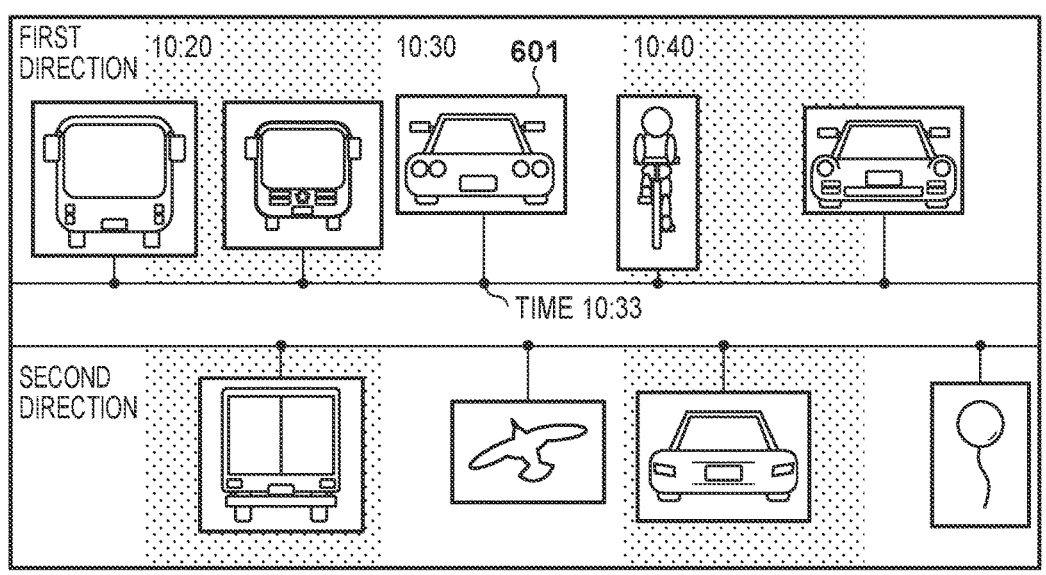
FIG. 6 is a view showing a display example according to the first embodiment.

Note that the display control unit 209 of the information processing apparatus 102 controls the display unit 210 of the display apparatus 103 to display the region image of the moving object and passing time in time series for each passing direction based on the passage information stored in the passage information storage unit 208. The control is performed in parallel to the series of processes in FIG. 4, or in accordance with a user instruction during or after the end of the series of processes in FIG. 4. Note that FIG. 6 is a view showing an example of a screen on which the display unit 210 displays the passage information as shown in FIG. 5. In FIG. 6, a horizontal direction represents times. Moving objects passing through in the first direction are displayed in the upper portion of a screen, and moving objects passing through in the second direction are displayed in the lower portion of the screen. Their positions in the horizontal direction are decided in accordance with the respective times of the passage information stored in the passage information storage unit 208. For example, a vehicle passes through in the first direction at 10:33, and an image 601 of the moving object is displayed.

As described above, the information processing apparatus according to this embodiment detects a moving object from a captured image, makes a passage determination of determining whether the moving object has passed through a predetermined position in the captured image, and extracts a region image of the moving object that has passed through the predetermined position from the captured image. Then, the information processing apparatus makes the display unit display the region image of the moving object in time series for each passing direction in which the moving object has passed through the predetermined position. This makes it possible to easily grasp the behavior of the moving object according to the passing direction.

Second Embodiment

In the first embodiment, the example has been described in which the region image of the detected moving object is displayed without any change. However, an example will be described in which a part of a region image is displayed in accordance with a passing direction.

<Arrangement of Information Processing System and Functional Arrangement of Each Apparatus>

Figure 8:
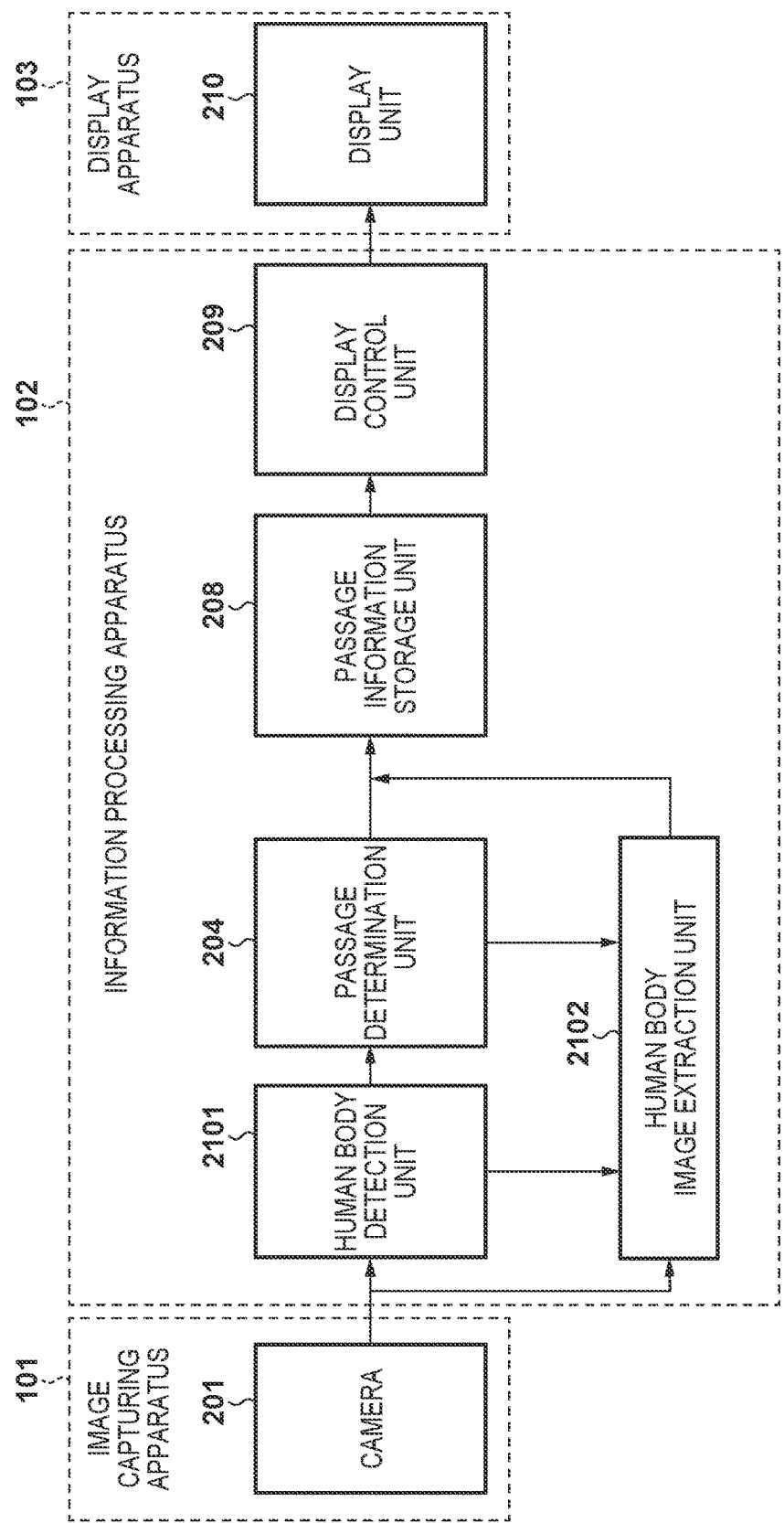
FIG. 8 is a block diagram showing an example of the functional arrangement of each apparatus of an information processing system according to the second embodiment.

FIG. 8 is a block diagram showing an example of the functional arrangement of each apparatus of an information processing system according to the second embodiment. The arrangement of an information processing apparatus 102 out of the respective apparatuses is different from that in the first embodiment. The functional arrangement of the information processing apparatus 102 will mainly be described below. Note that the hardware arrangement is the same as in the first embodiment, and thus a description thereof will be omitted.

In the first embodiment, a general moving object is to be detected. In the second embodiment, however, out of moving objects, in particular, a human body is to be detected. Therefore, the information processing apparatus 102 according to the second embodiment includes a human body detection unit 2101 in place of the moving object detection unit 203 of the first embodiment and a human body image extraction unit 2102 in place of the moving object image extraction unit 205.

The human body detection unit 2101 detects and tracks a human body by obtaining an image from a camera 201 of an image capturing apparatus 101, and outputs coordinates and motion vector in a rectangular region of the human body. The human body image extraction unit 2102 extracts a region image of a human body determined by a passage determination unit 204 that it has passed through a passage sensing line from the image obtained from the camera 201. More specifically, based on the coordinates in the rectangular region of the human body output by the human body detection unit 2101, the human body image extraction unit 2102 extracts the rectangular region of the human body as the region image. At this time, the human body image extraction unit 2102 changes a region to extract based on the passing direction of the human body obtained from the passage determination unit 204.

Figure 7:
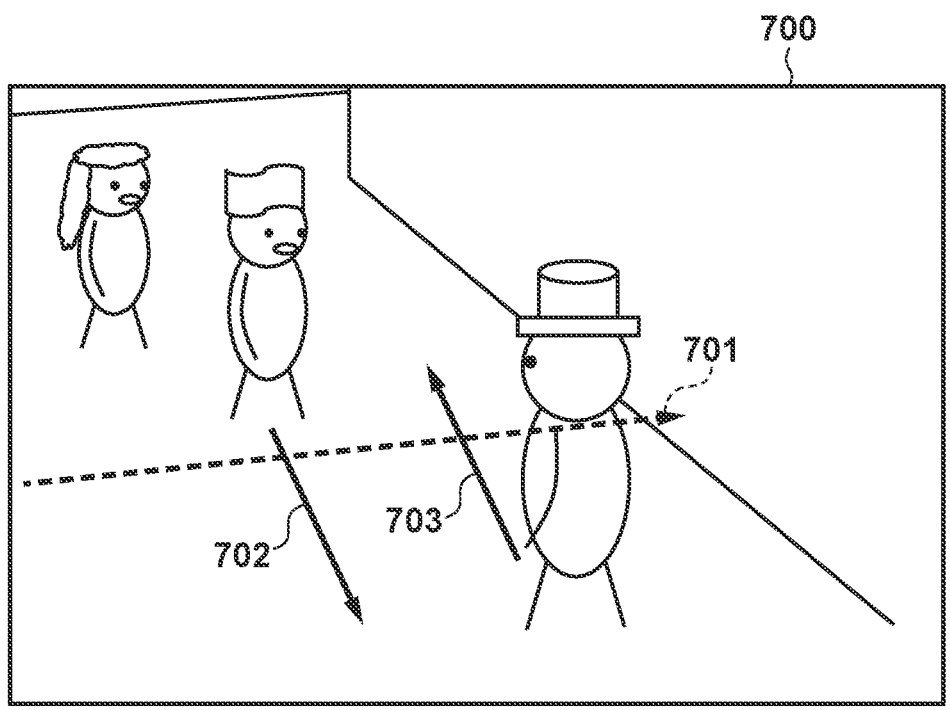
FIG. 7 is a view showing the outline of a scene according to the second embodiment.

Note that FIG. 7 is a view showing an example of a video scene captured by the image capturing apparatus 101 according to this embodiment. By designating a passage sensing line 701 in advance in a video scene 700, the information processing apparatus 102 can sense the passage of the human body in two directions of a first direction 702 and second direction 703 crossing the passage sensing line 701. The passage determination unit 204 outputs, for each human body, a passage determination result and a passing direction if it determines that the human body has passed through.

In the case of the scene as shown in FIG. 7, the front image of the human body is often obtained (the front of the human body is often observed) if the passing direction of the human body obtained from the passage determination unit 204 is the first direction 702. Thus, the human body image extraction unit 2102 extracts the rectangular region of the human body as a region image. Then, the human body image extraction unit 2102 further extracts the image of a face region by performing face detection on the region image. On the other hand, the back image (back shot image) of the human body is often obtained (the back is often observed) if the passing direction is the second direction 703. Thus, the human body image extraction unit 2102 extracts the rectangular region of the human body output by the human body detection unit 2101 as a region image without any change.

<Processing>

Figure 9:
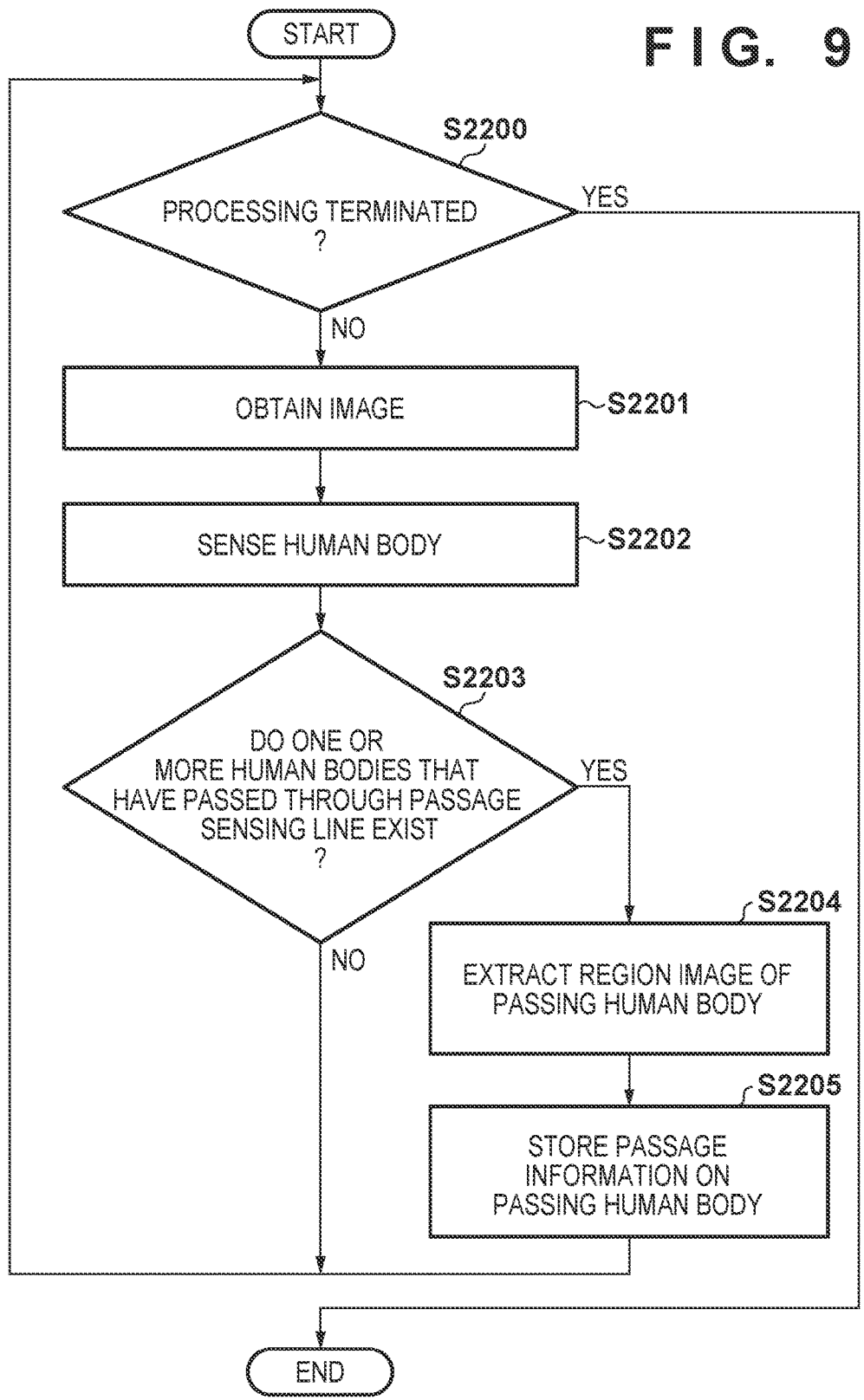
FIG. 9 is a flowchart showing a processing sequence according to the second embodiment.

A processing sequence executed by the information processing apparatus according to this embodiment will now be described with reference to a flowchart in FIG. 9. First, processes in steps S2200 to S2203 and S2205 are, respectively, the same as the processes in steps S700 to S703 and S705 of FIG. 4 described in the first embodiment, and thus a description thereof will be omitted.

In step S2204, if the passing direction is the first direction 702 shown in FIG. 7, the human body image extraction unit 2102 extracts a rectangular region (entire region) of the human body as a region image and further extracts the image of a face region (partial region) by performing face detection on the region image. On the other hand, if the passing direction is the second direction 703, the human body image extraction unit 2102 extracts the rectangular region of the human body output by the human body detection unit 2101 as a region image without any change.

Figure 10:
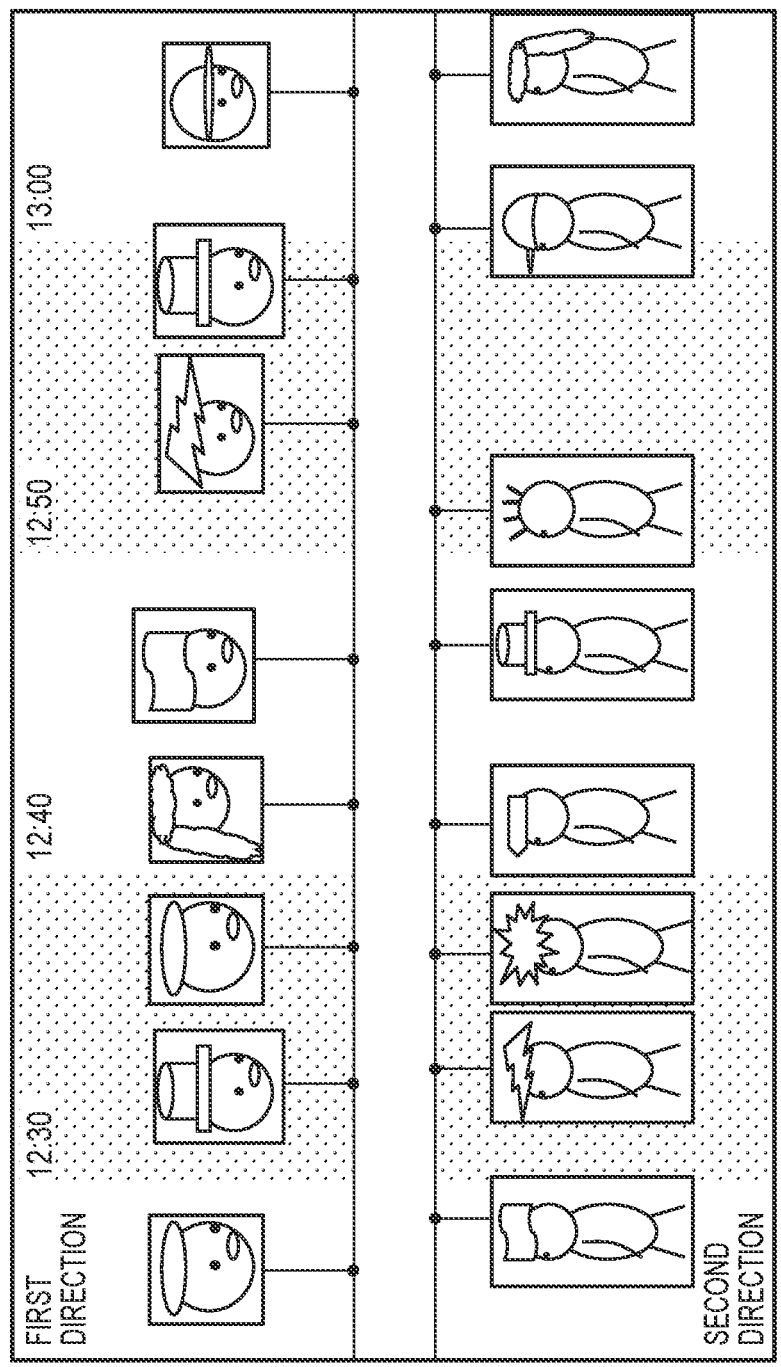
FIG. 10 is a view showing a display example according to the second embodiment.

Note that a display control unit 209 of the information processing apparatus 102 controls a display unit 210 of a display apparatus 103 to display the region image (or a face region image) of the human body and passing time in time series for each passing direction based on passage information stored in a passage information storage unit 208. The control is performed in parallel to a series of processes in FIG. 9, or in accordance with a user instruction during or after the end of the series of processes in FIG. 9. Note that FIG. 10 is a view showing an example of a screen on which the display unit 210 displays the passage information as shown in FIG. 7. In FIG. 10, a horizontal direction represents times. The face region images of human bodies passing through in the first direction are displayed in the upper portion of a screen, and the region images of human bodies passing through in the second direction are displayed in the lower portion of the screen.

As described above, the information processing apparatus according to this embodiment detects a human body from a captured image and makes a passage determination of determining whether a human body has passed through a predetermined position in a captured image. Then, the information processing apparatus extracts a region image of the human body that has passed through the predetermined position from the captured image by changing an extraction region in accordance with a passing direction and makes the display unit display the region image of the human body or a part of the region image in time series for each passing direction in which the human body has passed through the predetermined position. This makes it possible to easily grasp the behavior of the moving object according to the passing direction and to grasp more detailed information depending on the passing direction.

Third Embodiment

In the first embodiment and the second embodiment, the image of the extracted moving object (human body) is an image at the time of passage. However, a case in which an image at the instant that a moving object (human body) passes through is blurred or a case in which the moving object (human body) overlaps another moving object (human body) is also considered. To cope with this, in this embodiment, an example will be described in which an appropriate image is selected from past images of the moving object (human body) and displayed. A difference from the second embodiment targeted for the human body will be described below. As in the first embodiment, however, the third embodiment is also applicable if it is targeted for a moving object broadly.

<Arrangement of Information Processing System and Functional Arrangement of Each Apparatus>

Figure 11:
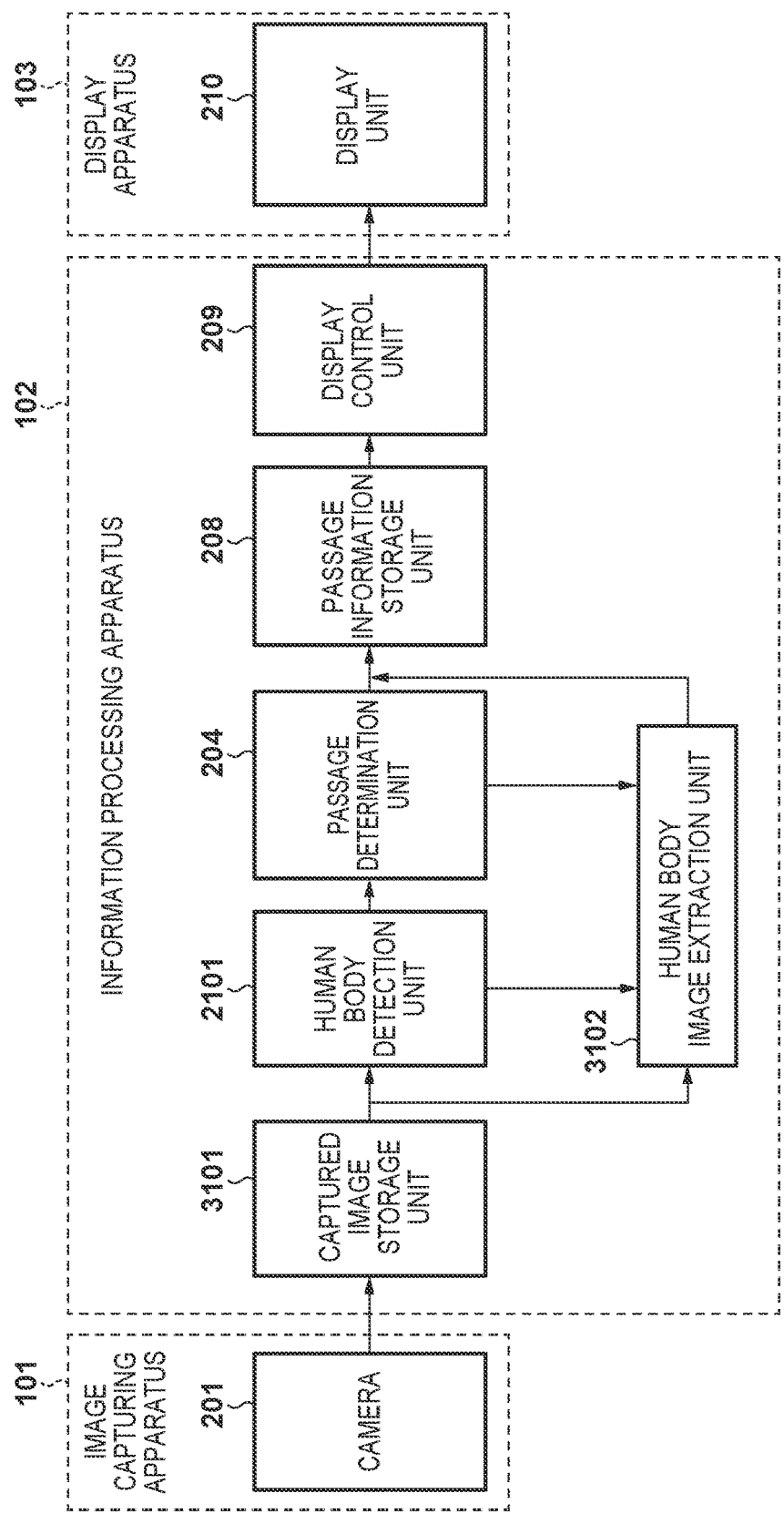
FIG. 11 is a block diagram showing an example of the functional arrangement of each apparatus of an information processing system according to the third embodiment.

FIG. 11 is a block diagram showing an example of the functional arrangement of each apparatus of an information processing system according to the third embodiment. The arrangement of an information processing apparatus 102 out of the respective apparatuses is different from that in the second embodiment. The functional arrangement of the information processing apparatus 102 will mainly be described below. Note that the hardware arrangement is the same as in the second embodiment, and thus a description thereof will be omitted.

In addition to the arrangement of the information processing apparatus of the second embodiment, the information processing apparatus 102 according to the third embodiment further includes a captured image storage unit 3101. The captured image storage unit 3101 stores images sequentially input from a camera 201 for the past and future of a predetermined time.

<Processing>

A processing sequence executed by the information processing apparatus according to this embodiment will now be described with reference to the flowchart in FIG. 9 that was also described in the second embodiment. Processes in steps S2200, S2202, S2203 and S2205 are the same as in the second embodiment, and thus a description thereof will be omitted.

In step S2201, the captured image storage unit 3101 stores an image obtained from the camera 201. The captured image storage unit 3101 stores a plurality of images captured within a predetermined time of the current time.

In step S2204, a human body image extraction unit 3102 selects a captured image based on the edge intensity of the image from captured images in a plurality of frames before and after the instant of passing of a human body determined by a passage determination unit 204 that it has passed through a passage sensing line. Then, the human body image extraction unit 3102 extracts a region image from the selected captured image. Note that the captured images in the plurality of frames before and after the instant of passage of the human body are some of the plurality of images in the past stored in the captured image storage unit 3101. For example, the human body image extraction unit 3102 calculates the edge intensity of each image and selects an image having the highest intensity. This allows the human body image extraction unit 3102 to select an in-focus clear image. Alternatively, the human body image extraction unit 3102 may calculate the area of an overlapping region between a rectangular region of a human body of interest and a rectangular region of another human body, and select an image having the smallest area. This allows the human body image extraction unit 3102 to select an image in which the human body of interest does not fall into the shadow of the other human body, and a wider human body region can be recognized visually. Alternatively, the human body image extraction unit 3102 may perform face detection on the region images of the human body, calculate reliability scores of the face detection, and select an image having the highest reliability score. This allows the human body image extraction unit 3102 to select an image that includes the face of a person appropriately.

As described above, the information processing apparatus according to this embodiment stores the plurality of past images of the moving object (human body) back captured within the predetermined time, and selects an appropriate image from those images and displays it. The information processing apparatus selects, for example, a clear image without a blur, an image with less overlapping with another moving object (human body), an image having the high reliability score of face detection, or the like. This makes it possible to provide an image suitable for a check by a user.

Fourth Embodiment

In the first to third embodiments, the respective moving objects (human bodies) are treated as separate moving objects when the images of the moving objects (human bodies) passing through the passage sensing line are displayed. However, the same moving object may pass through a passage sensing line a plurality of times or pass through in different passing directions. In this embodiment, an example will be described in which the behavior of such a moving object (human body) can be visualized appropriately and grasped easily.

<Arrangement of Information Processing System and Functional Arrangement of Each Apparatus>

Figure 12:
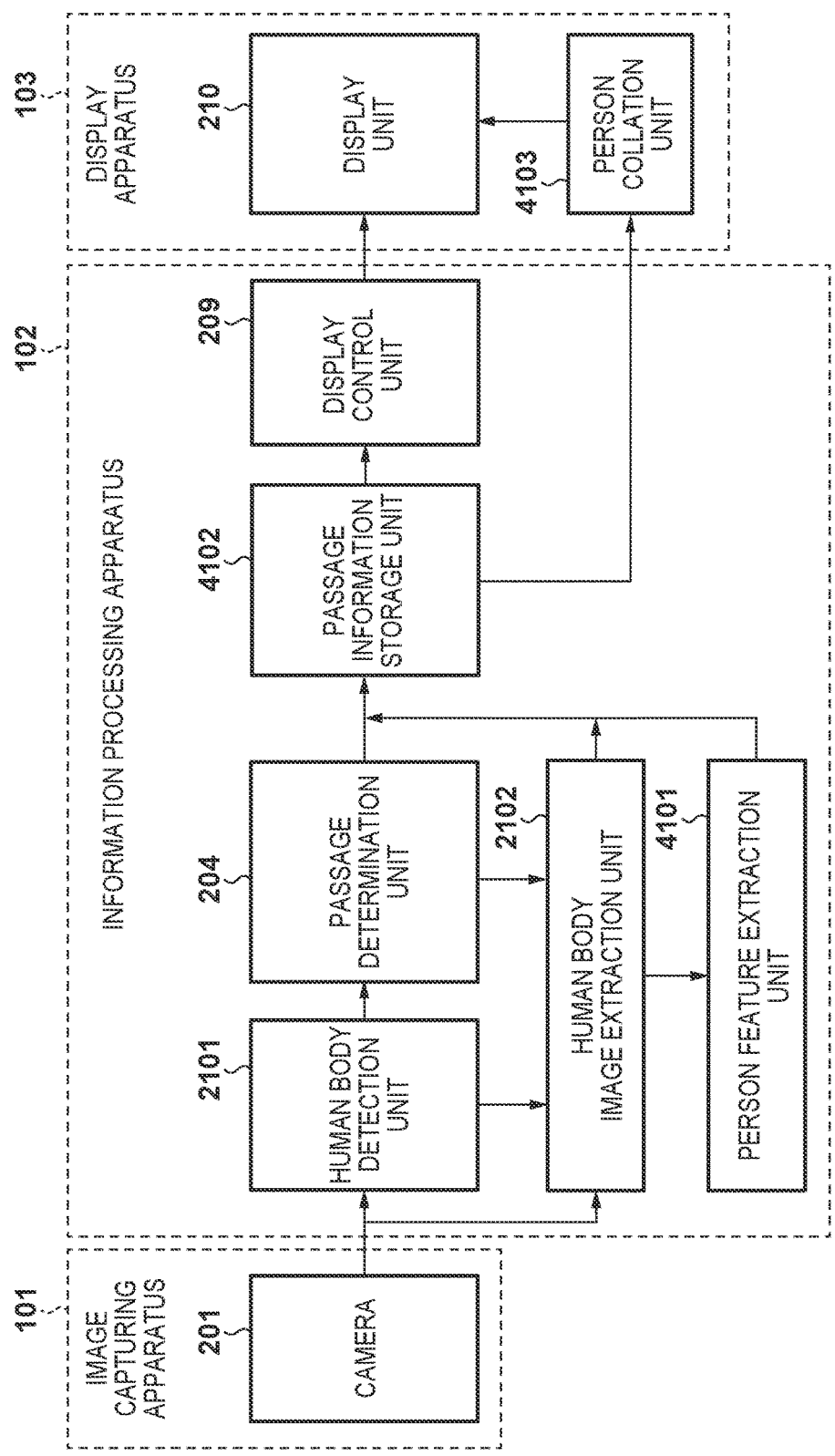
FIG. 12 is a block diagram showing an example of the functional arrangement of each apparatus of an information processing system according to the fourth embodiment.

FIG. 12 is a block diagram showing an example of the functional arrangement of each apparatus of an information processing system according to the fourth embodiment. The arrangement of an information processing apparatus 102 and the arrangement of a display apparatus 103 out of the respective apparatuses are different from those in the second embodiment. The functional arrangements of the information processing apparatus 102 and display apparatus 103 will mainly be described below. Note that the hardware arrangement is the same as in the second embodiment, and thus a description thereof will be omitted.

In addition to the arrangement of the information processing apparatus of the second embodiment described with reference to FIG. 8, the information processing apparatus 102 according to the fourth embodiment further includes a person feature extraction unit 4101 and also includes a passage information storage unit 4102 in place of a passage information storage unit 208.

The person feature extraction unit 4101 extracts a person feature vector used for personal identification (individual identification) by using a rectangular image of a human body extracted by a human body image extraction unit 2102. The person feature extraction unit 4101 extracts, for example, a person feature vector that characterizes clothing of a person by extracting three pieces of color information of a head, upper body, and lower body. Alternatively, the person feature extraction unit 4101 may input the region image of the human body to a neutral network and extract the output of an intermediate layer as a human body feature vector. Alternatively, the person feature extraction unit 4101 may calculate a height or a body type using the region image of the human body and set that calculation result as a human body feature vector. Alternatively, the person feature extraction unit 4101 may use the region image of the human body as a human body feature vector without any change.

Figure 14:
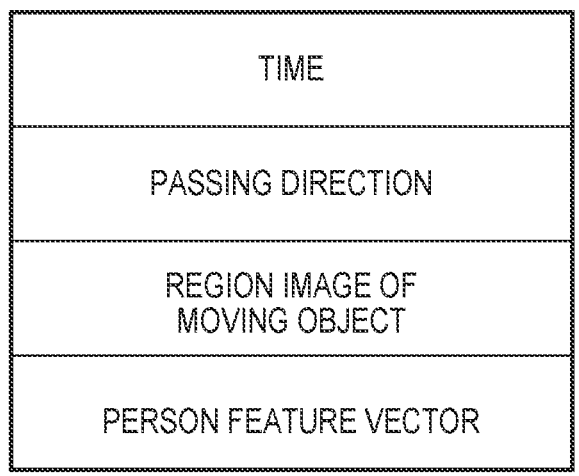
FIG. 14 is a table showing passage information stored in a passage information storage unit according to the fourth embodiment.

In addition to the passage information shown in FIG. 5, the passage information storage unit 4102 further stores the person feature vector extracted by the person feature extraction unit 4101 as passage information as shown in FIG. 14.

In addition to a display unit 210, the display apparatus 103 according to the fourth embodiment further includes a person collation unit 4103. The person collation unit 4103 performs collation by a person feature vector on the passage information stored in the passage information storage unit 4102 and determines the same person between pieces of the passage information. Note that the information processing apparatus 102 may have the function of the person collation unit 4103.

<Processing>

Figure 13:
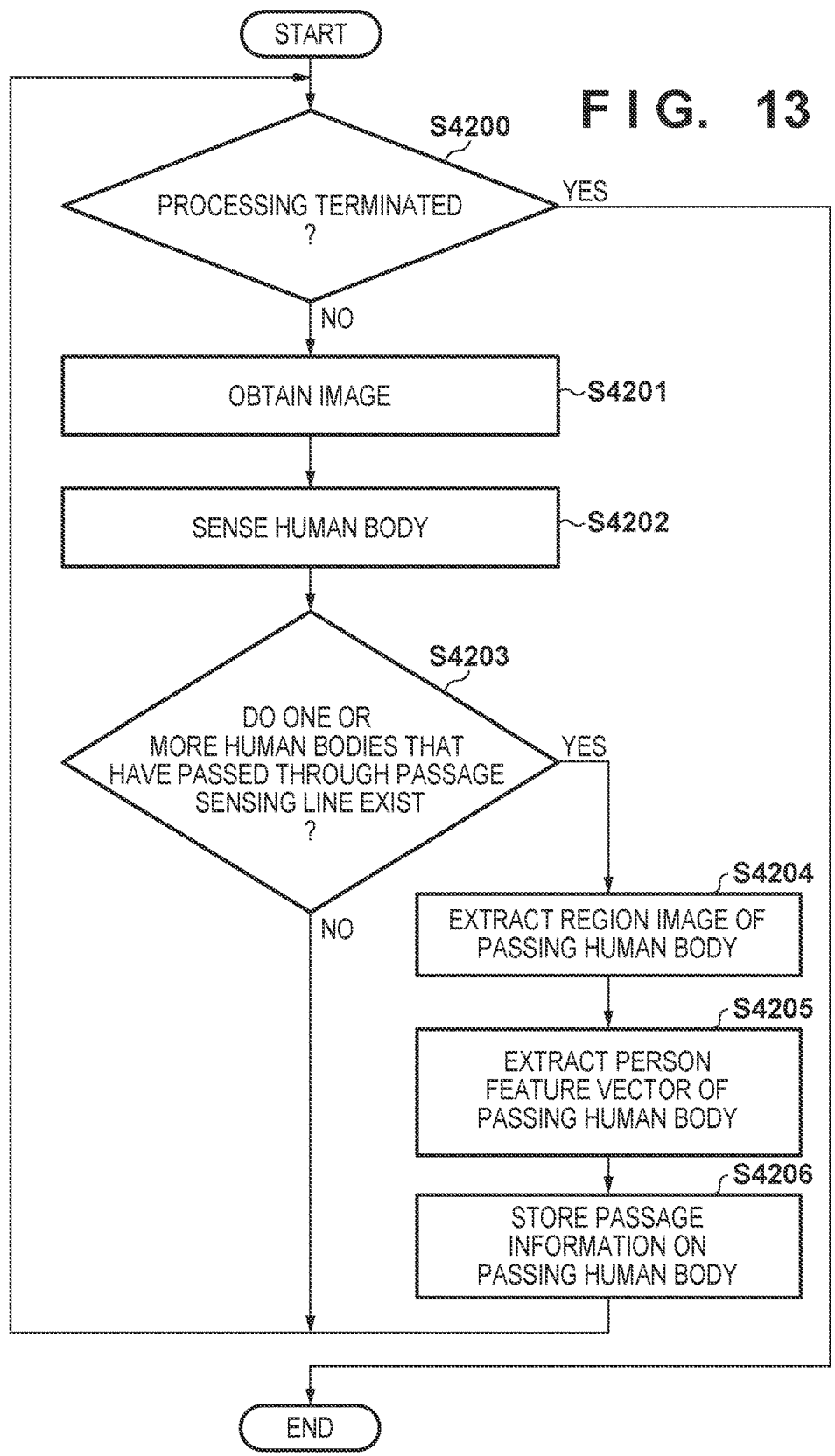
FIG. 13 is a flowchart showing a processing sequence according to the fourth embodiment.

A processing sequence executed by the information processing apparatus according to this embodiment will now be described with reference to a flowchart in FIG. 13. Processes in steps S4200 to S4204 are, respectively, the same as the processes in steps S2200 to S2204 described in the second embodiment with reference to FIG. 9, and thus a description thereof will be omitted.

In step S4205, the person feature extraction unit 4101 extracts a person feature vector used for personal identification by using a rectangular image of the human body extracted by the human body image extraction unit 2102. In step S4206, setting current time as passage occurrence time, the passage information storage unit 4102 associates information on a passing direction output by a passage determination unit 204, the region image of the human body extracted by the human body image extraction unit 2102, and the person feature vector extracted by the person feature extraction unit 4101 with each other and stores them as passage information.

Figure 15:
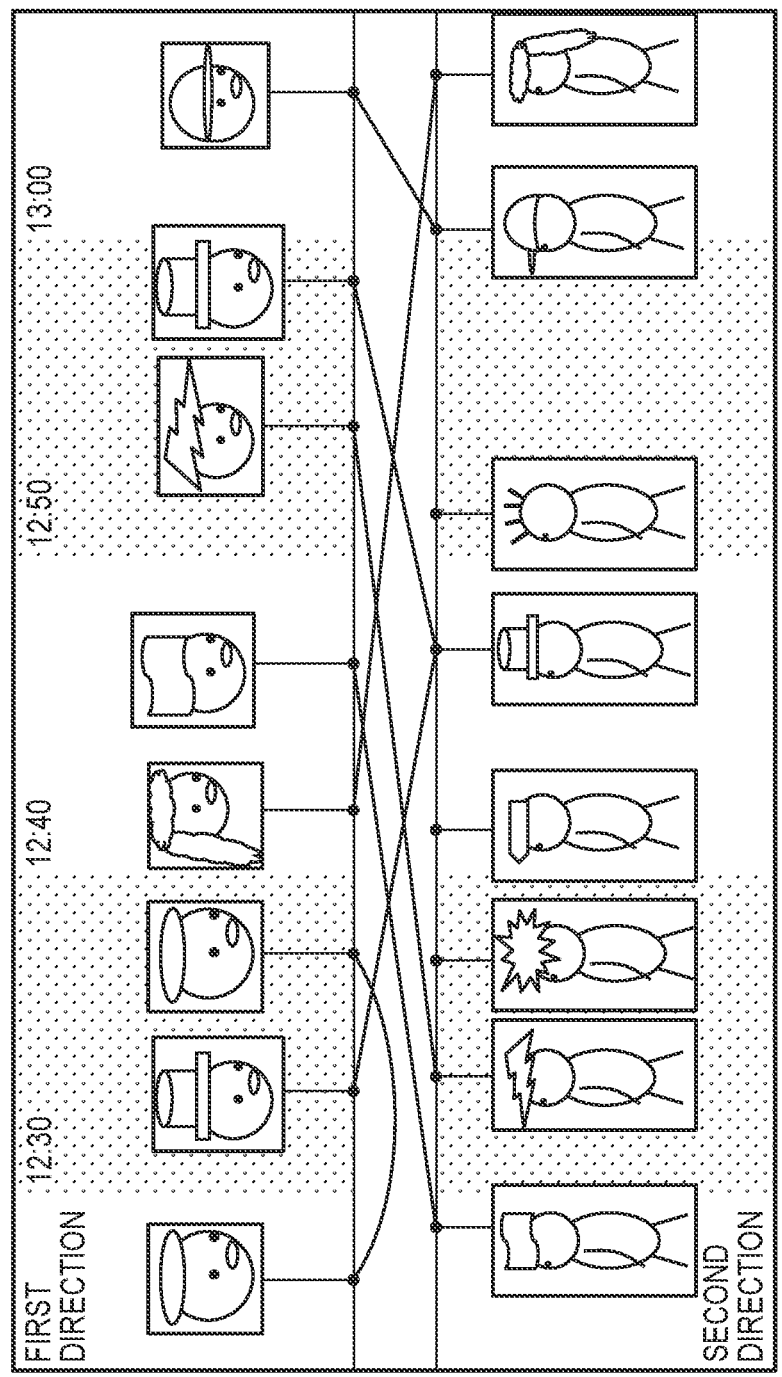
FIG. 15 is a view showing a display example according to the fourth embodiment.

Note that the person collation unit 4103 of the display apparatus 103 performs collation by the person feature vector on the passage information stored in the passage information storage unit 4102 and determines the same person (determines whether moving objects are the same moving object) between pieces of the passage information. Then, the display unit 210 connects the pieces of the passage information determined as the same person by the person collation unit 4103 with lines in the center of a screen and displays them as shown in FIG. 15. In addition to the display of FIG. 10, in FIG. 15, images determined as the same person are connected with lines of a different color for each person. Note that except for the colors, a line thickness or a line type (a dotted line, a solid line, an alternate long and short dashed line, or the like) may be changed for each person, or they may be combined.

As described above, the information processing apparatus (or the display apparatus) according to this embodiment displays the same persons in association with each other (by, for example, connecting region images with lines) when displaying a detected person in time series for each passing direction. This makes it possible to visually grasp a specific behavior of a passing person.

Fifth Embodiment

In each of the first to fourth embodiments, the example has been described in which the single camera is used as the image capturing apparatus. In contrast to this, in this embodiment, an example will be described in which a more appropriate image of a moving object (human body) is extracted and displayed by using a plurality of cameras.

Note that each of FIGS. 16A to 16C is a view showing an example of a video scene captured by an image capturing apparatus that includes a plurality of cameras according to this embodiment. FIG. 16A is a bird's eye view showing the scene. The image of a moving object (human body) passing through a passage sensing line 1601 in a first direction 1602 or a second direction 1603 is captured by using a first camera 161 and a second camera 162. FIG. 16B shows the video scene captured by the first camera 161. FIG. 16C shows the video scene captured by the second camera 162. The passage sensing line 1601 is set in advance with respect to each camera so as to exist at the same position on a space.

Regarding each person passing through in the first direction 1602, while the first camera 161 captures the person as seen from behind (FIG. 16B), the second camera 162 can capture the person as seen from the front (FIG. 16C). On the contrary, regarding a person passing through in the second direction 1603, while the second camera 162 captures the person as seen from the behind (FIG. 16C), the first camera 161 can capture the person as seen from the front (FIG. 16B).

In such a situation, it becomes possible to display images that include clearer faces of persons by using the images of the second camera 162 for the persons passing through in the first direction 1602 and the image of the first camera 161 for the person passing through in the second direction 1603.

<Arrangement of Information Processing System and Functional Arrangement of Each Apparatus>

Figure 17:
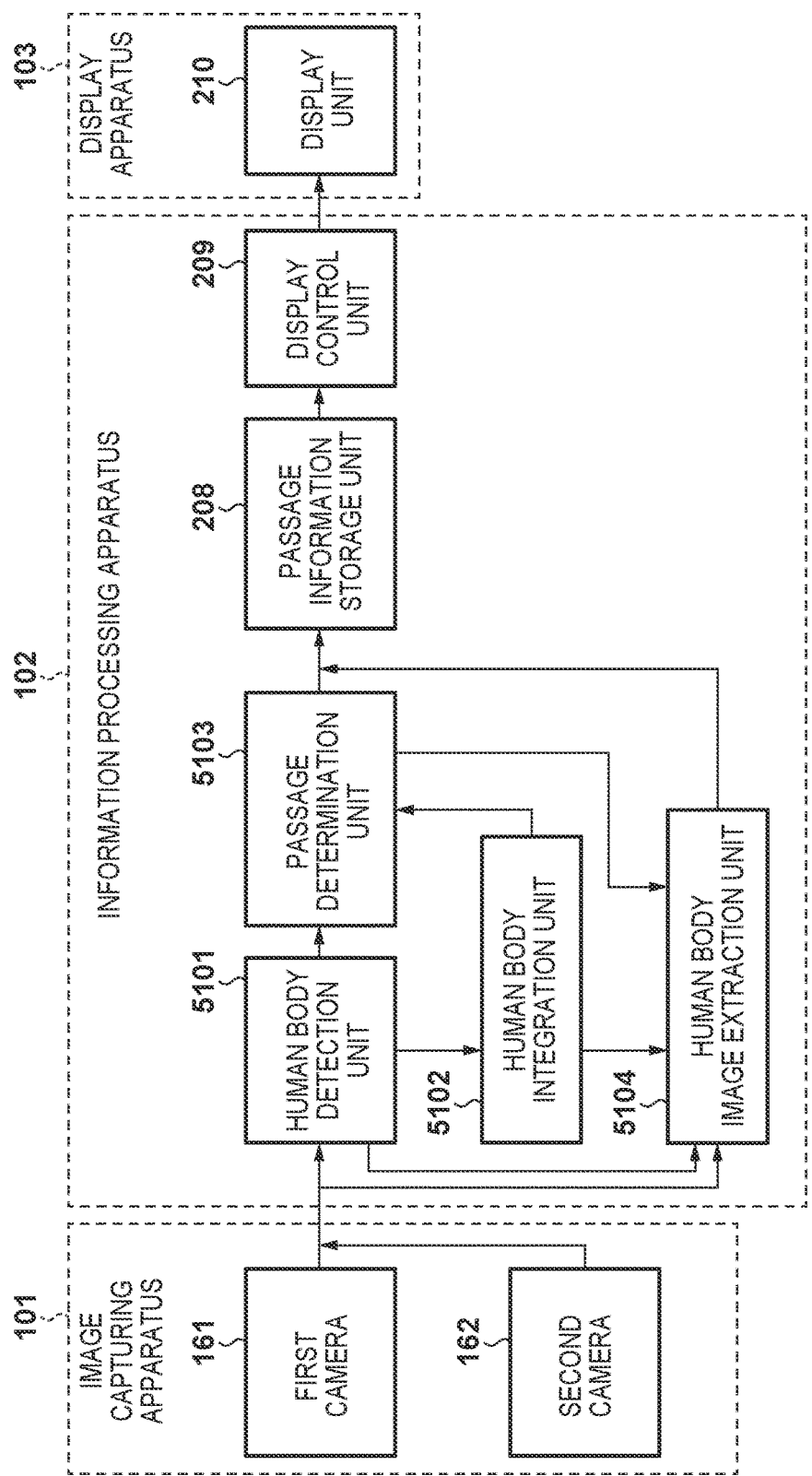
FIG. 17 is a block diagram showing an example of the functional arrangement of each apparatus of an information processing system according to the fifth embodiment.

FIG. 17 is a block diagram showing an example of the functional arrangement of each apparatus of an information processing system according to the fifth embodiment. The arrangements of an image capturing apparatus 101 and information processing apparatus 102 out of the respective apparatuses are different from those in the second embodiment. The functional arrangements of the image capturing apparatus 101 and information processing apparatus 102 will mainly be described below. Note that the hardware arrangement is the same as in the second embodiment, and thus a description thereof will be omitted.

The image capturing apparatus 101 includes two cameras of the first camera 161 and the second camera 162 as shown in FIG. 16A. The information processing apparatus 102 includes a human body detection unit 5101, a human body integration unit 5102, a passage determination unit 5103, a human body image extraction unit 5104, a passage information storage unit 208, and a display control unit 209.

The human body detection unit 5101 has the same function as a human body detection unit 2101, detects and tracks a human body by obtaining an image from each of the first camera 161 and the second camera 162, and outputs coordinates and motion vector in a rectangular region of the human body.

The human body integration unit 5102 obtains the coordinates in the rectangular region of the human body included in the image of each of the first camera 161 and the second camera 162 from the human body detection unit 5101, and determines whether persons are the same person based on a geometrical positional relationship in a rectangle of the human body. Then, regarding rectangles of all human bodies, the human body integration unit 5102 associates coordinates in the rectangles, motion vectors in the rectangles, and identifiers representing persons with each other, and outputs them as the same person information. For example, a method disclosed in Japanese Patent Laid-Open No. 2016-157336 can be used to determine whether the persons are the same person.

For each identifier representing a person included in the same person information obtained from the human body integration unit 5102, the passage determination unit 5103 determines whether the person represented by the identifier has passed through the passage sensing line 1601. Then, the passage determination unit 5103 outputs a passage determination result, information indicating a passing direction (the first direction 1602 or the second direction 1603) if it determines that the person has passed through, and the identifier representing the person. The passage determination unit 5103 can, for example, select a rectangle having the largest area from rectangles of a plurality of human bodies representing the persons and make passage determinations on the rectangles of the human bodies by the same method as the passage determination unit 204 described in the first embodiment.

The human body image extraction unit 5104 outputs an appropriate image of the person determined by the passage determination unit 5103 that it has passed through. More specifically, regarding the identifier representing the passing person obtained from the passage determination unit 5103, the human body image extraction unit 5104 obtains the coordinates in the rectangles of the plurality of human bodies associated with the identifier representing the person from the same person information obtained from the human body integration unit 5102. Regarding the coordinates in the rectangle of each human body, the human body image extraction unit 5104 obtains an image that includes the human body from the image capturing apparatus 101, extracts an image in a rectangular region of the human body as a region image, and performs face detection on the region image. If a face is detected as a result of the face detection, the human body image extraction unit 5104 further extracts a face image from the region image. If no face is detected from any of the region images, the human body image extraction unit 5104 outputs an image having the largest area out of the region images.

Note that the example in which two cameras are used has been described in this embodiment. However, three or more cameras may be included. Furthermore, in this embodiment, the arrangement in which the image capturing apparatus 101 and the information processing apparatus 102 are separated from each other has been described as an example. However, an arrangement may be adopted in which one camera out of a plurality of cameras is used as a main device, and it has the function of the information processing apparatus.

<Processing>

Figure 18:
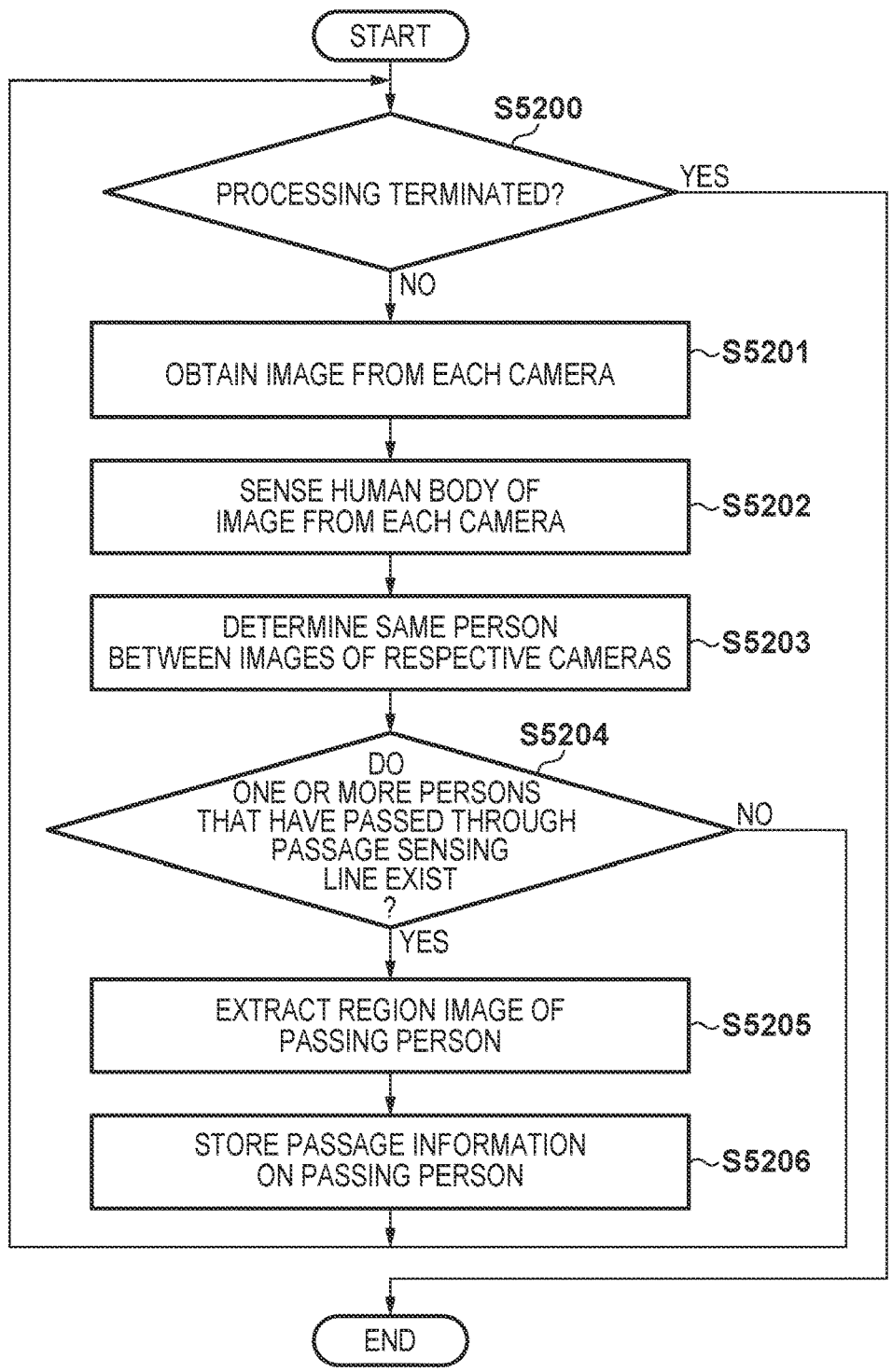
FIG. 18 is a flowchart showing a processing sequence according to the fifth embodiment.

A processing sequence executed by the information processing apparatus according to this embodiment will now be described with reference to a flowchart in FIG. 18. First, processes in steps S5200 and S5206 are, respectively, the same as the processes in steps S2200 and S2205 of FIG. 9 described in the second embodiment, and thus a description thereof will be omitted.

In step S5201, the human body detection unit 5101 obtains an image from each of the first camera 161 and the second camera 162. In step S5202, the human body detection unit 5101 detects and tracks a human body from the image obtained from each camera, and outputs coordinates and motion vector in a rectangular region of the human body.

In step S5203, the human body integration unit 5102 obtains the coordinates in the rectangular region of the human body included in the image of each of the first camera 161 and the second camera 162 from the human body detection unit 5101, and determines whether persons are the same person based on a geometrical positional relationship in a rectangle of the human body. Then, regarding rectangles of all human bodies, the human body integration unit 5102 associates coordinates in the rectangles, motion vectors in the rectangles, and identifiers representing persons with each other, and outputs them as the same person information.

In step S5204, the passage determination unit 5103 makes, on each of one or more persons detected by the human body detection unit 5101, an intersection determination between the coordinates and motion vector in the rectangle of the person and the passage sensing line 1601 at a position designated in advance. Then, the passage determination unit 5103 determines whether the person has passed through the passage sensing line 1601 on a two-dimensional image. If there are one or more persons who have passed through the passage sensing line 1601, the process advances to step S5205. On the other hand, if there is no person who has passed through the passage sensing line 1601, the process returns to step S5200.

In step S5205, based on the same person information obtained from the human body integration unit 5102, the human body image extraction unit 5104 obtains the coordinates in the rectangles of the plurality of human bodies associated with the identifiers each representing the person determined by the passage determination unit 5103 that it has passed through. Regarding the coordinates in the rectangle of each human body, the human body image extraction unit 5104 obtains an image that includes the human body from each camera, extracts the image in the rectangular region of the human body as a region image, and performs face detection on the region image. If a face is detected, the human body image extraction unit 5104 further extracts a face image from the region image. Note that FIG. 19 shows a screen example in which passage information is displayed on the display unit 210 according to this embodiment. According to this embodiment, it is possible to display an image that includes the face of a passing person out of images obtained by a plurality of cameras as the image of the person in time series for each passing direction.

Note that if no face is detected from any of the region images, the human body image extraction unit 5104 outputs an image having the largest area out of the region images. This makes it possible to present a second suitable image for confirming a passing person after the face image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-254092, filed Dec. 27, 2016, which is hereby incorporated by reference wherein in its entirety.

What is claimed is:

1. An information processing apparatus comprising a computer executing instructions that, when executed by the computer, cause the computer to function as:
   a moving object detection unit configured to detect a moving object from a captured image;
   a passage determination unit configured to determine that the moving object has passed through a predetermined position in the captured image;
   an image extraction unit configured to extract a region image of the moving object that has passed through the predetermined position from the captured image; and
   a display control unit configured to make a display unit display, in time series, the region image for each passing direction of the moving object that has passed through the predetermined position.

2. The apparatus according to claim 1, wherein the image extraction unit changes an extraction region of the region image of the moving object in accordance with the passing direction at the predetermined position.

3. The apparatus according to claim 2, wherein the image extraction unit extracts a region image in an entire region of the moving object if the passing direction is a first direction and extracts a region image in a partial region of the moving object if the passing direction is a second direction.

4. The apparatus according to claim 3, wherein the moving object is a human body, and the partial region is a face region.

5. The apparatus according to claim 4, wherein the second direction is a direction in which a front of the human body is observed at the time of passage in the captured image.

6. The apparatus according to claim 4, wherein the first direction is a direction in which a back of the human body is observed at the time of passage in the captured image.

7. The apparatus according to claim 1, wherein the image extraction unit selects a captured image based on an edge intensity of an image from captured images in a plurality of frames before and after an instant of passing of the moving object that has passed through the predetermined position and extracts the region image from the selected captured image.

8. The apparatus according to claim 1, wherein the image extraction unit selects a captured image based on an area of an overlapping region with a region of another moving object from captured images in a plurality of frames before and after an instant of passing of the moving object that has passed through the predetermined position and extracts the region image from the selected captured image.

9. The apparatus according to claim 1, wherein the image extraction unit selects a captured image based on a reliability score of face detection for each captured image from captured images in a plurality of frames before and after an instant of passing of the moving object that has passed through the predetermined position and extracts the region image from the selected captured image.

10. The apparatus according to claim 1, wherein the instructions, when executed by the computer, further cause the computer to function as:

a feature extraction unit configured to extract a feature for individual identification of the moving object from the captured image; and a determination unit configured to determine whether moving objects different in passing direction are the same moving object by using the feature, wherein the display control unit displays the moving objects determined as the same moving object by the determination unit in association with each other on the display unit.

11. The apparatus according to claim 1, wherein the moving object is a human body, the apparatus further comprises a determination unit configured to determine whether persons in a plurality of captured images captured by a plurality of cameras that capture the same space from different directions are the same person, and a captured image to be extracted by the image extraction unit is selected based on a result of face detection of a person from the plurality of captured images determined as the same person.

12. A method of controlling an information processing apparatus, the method comprising:

detecting a moving object from a captured image;

determining that the moving object has passed through a predetermined position in the captured image;

extracting a region image of the moving object that has passed through the predetermined position from the captured image; and making a display unit display, in time series, the region image for each passing direction of the moving object that has passed through the predetermined position.

13. The apparatus according to claim 1, wherein the display control unit configured to make the display unit display a first area and a second area, wherein the region images each corresponding to the moving object that has passed though the predetermined position in a first direction are displayed in time series in the first area, and wherein the region images each corresponding to the moving object that has passed though the predetermined position in a second direction different from the first direction are displayed in time series in the second area.

14. The method according to claim 12, wherein an extraction region of the region image of the moving object is changed in the extracting in accordance with the passing direction at the predetermined position.

15. The method according to claim 14, wherein a region image in an entire region of the moving object is extracted in the extracting, if the passing direction is a first direction, and wherein a region image in a partial region of the moving object is extracted in the extracting, if the passing direction is a second direction.

16. The method according to claim 15, wherein the moving object is a human body, and the partial region is a face region.

17. The method according to claim 16, wherein the second direction is a direction in which a front of the human body is observed at the time of passage in the captured image.

18. The method according to claim 16, wherein the first direction is a direction in which a back of the human body is observed at the time of passage in the captured image.

19. The method according to claim 12, wherein a first area and a second area is displayed is in the display unit in the making, wherein the region images each corresponding to the moving object that has passed though the predetermined position in a first direction are displayed in time series in the first area, and wherein the region images each corresponding to the moving object that has passed though the predetermined position in a second direction different from the first direction are displayed in time series in the second area.

20. A non-transitory computer-readable storage medium storing a computer program for causing a computer to execute a method, the method comprising;

detecting a moving object from a captured image;

determining that the moving object has passed through a predetermined position in the captured image;

extracting a region image of the moving object that has passed through the predetermined position from the captured image; and making a display unit display, in time series, the region image for each passing direction of the moving object that has passed through the predetermined position.

* * * * *